United States Patent [19]

Maussion

[11] 4,182,481
[45] Jan. 8, 1980

[54] BAR CODE READING DEVICE

[75] Inventor: Daniel Maussion, Angers, France

[73] Assignee: Compagnie International pour l'Informatique Cii-Honeywell Bull (Societe Anonyme), Paris, France

[21] Appl. No.: 936,693

[22] Filed: Aug. 25, 1978

[30] Foreign Application Priority Data

Aug. 30, 1977 [FR] France .................. 77 26343

[51] Int. Cl.$^2$ .................. G06K 7/08; G06K 19/06
[52] U.S. Cl. .................. 235/449; 235/462; 235/493; 235/494; 360/40; 360/113
[58] Field of Search .................. 235/449, 454, 462, 463, 235/494; 340/146, 32; 250/555, 566, 568, 569; 360/40

[56] References Cited

U.S. PATENT DOCUMENTS

| 3,044,696 | 7/1962 | Feissel | 235/494 |
|---|---|---|---|
| 3,286,233 | 11/1966 | Lesueur | 340/146.3 |
| 3,309,667 | 3/1967 | Feissel et al. | 340/146.3 |
| 3,610,891 | 10/1971 | Raciazek | 235/494 |
| 3,663,803 | 5/1972 | Mohan et al. | 235/92 V |
| 3,688,955 | 9/1972 | L'Huillier | 235/494 |
| 3,700,858 | 10/1972 | Murthy | 235/494 |

FOREIGN PATENT DOCUMENTS 2302562  9/1976  France .................. 235/454

OTHER PUBLICATIONS

Kulikowski et al., Three Sensor Bar-Code Scanner Using Sensor Spacing as a Reference, IBM Tech. Disc. Bull., vol. 17, #7, Dec. 1974, pp. 1987-1988.

*Primary Examiner*—Daryl W. Cook
*Attorney, Agent, or Firm*—Cameron, Kerkam, Sutton, Stowell & Stowell

[57] ABSTRACT

A device for reading printed characters formed of elements separated by spaces of first and second kinds in accordance with a character code. The device includes a read head arranged for relative motion with respect to the elements of a character, and is characterized by being insensitive to the speed at which the character elements move past the read head. The read head includes three element detectors physically spaced such that the first and second detectors are separated by a first kind of space, and the first and third detectors are separated by a distance equal to the second kind of space. Suitable circuitry is connected to the detectors for identifying the two kinds of space. The first kind of space is identified when the first and second detectors simultaneously detect character elements, and the second kind of space is identified when the first and third detectors simultaneously detect character elements.

13 Claims, 6 Drawing Figures

BAR CODE READING DEVICE

BACKGROUND OF THE INVENTION

The present invention relates generally to devices for reading coded information which represents characters. The invention is applicable to the reading of any type of character where the reading produces information in binary form which may be interpreted by digital logic circuitry. More particularly, the invention is especially applicable where the information is coded as vertical bars.

One arrangement for analyzing vertical bar coded information is described in French Pat. No. 1,271,150 which was applied for on July 26, 1960 by Compagnie des Machines Bull.

In this particular coding scheme, the bars representing each character are separated by long and short intervals arranged in accordance with a combination code. Specifically, the intervals are defined by the distances separating the leading (or trailing) edges of the bars.

For example, the so-called "two from six" code provides a coding system embracing fifteen combinations covering the figures from 1 to 9 and five special symbols which are used as boundary symbols or beginning- and end-of-word signs. The number of bars selected is seven. This method of coded representation is extremely advantageous in that it tolerates irregularities in the printed characters.

An analysis system such as that described in the above-mentioned French Pat. No. 1,271,150 enables the long and short spaces to be correctly identified so long as the irregularities remain within certain limits. In certain cases however, such as when a number of bars are sufficiently thick to merge, an incorrect number of bars is read. To overcome this disadvantage, the analysis system includes checking means which enable the number of bars read to be checked and, if there is any error, to invalidate the transfer of the coded combination. A buffer store, used in the arrangement for the temporary storage of the six code elements of each character to be identified, receives the signal to invalidate.

In a French Addition No. 79,378 to the main French Pat. No. 1,271,150, the intervals between the bars forming the characters are evaluated by time measuring devices which are adjusted according to the particular constant speed at which the document to be read passes in front of a read head.

These devices comprise at least one timebase and a plurality of amplitude discriminators. An AND gate enables the probability that a character was read to be detected and, by means of a signal from its output, authorizes the transfer of each coded combination to the buffer store.

Reading arrangements such as those described in the above-mentioned patents are particularly advantageous for reading bars printed in magnetizable ink. Reading magnetic characters with known magnetic read heads has advantages as compared with reading performed by means of photosensitive detectors. Detectors of this latter kind, for example photo-diodes, do in fact have the disadvantage of reading not only the normal printed areas but also blemishes. As a result, no distinction is made between the bars, on the one hand, and blemishes such as spots and inking faults (magnetic or otherwise), on the other hand.

Known arrangements for the magnetic reading of characters, such as that described in the above-mentioned French Addition No. 79,378, do include means for discriminating against errors due to inking faults and ferrous inclusions contained in the paper. Specifically, an amplitude discriminator or clipping-threshold amplifier whose threshold level can be adjusted to distinguish printing faults in the magnetized bars may be incorporated along the reading path.

As is described in French Pat. No. 1,295,497, improvements may also be made to character identifying systems by coupling two arrangements containing discriminators together. The discriminators are set for different threshold levels to detect, on the one hand, ferrous inclusions and, on the other hand, inking faults.

Another improvement, such as that described in French Pat. No. 1,375,037, incorporates means for checking the thickness of the bars so as to decrease still further the number of unjustifiably rejected characters by not excluding probable characters in which defective printing has been detected. By moving the document to be read in one direction or the opposite direction, such an arrangement enables a fault at the edge of a bar to be detected by causing the characters to be analyzed in both directions of reading without altering the recognition arrangement.

Despite the various improvements made to recognition systems, in particular for recognizing magnetic characters, the particular approaches described briefly above illustrate the difficulty in providing systems which reliably check the characters read and which do not reject characters when rejection is unwarranted. In effect, various prior art systems do not always allow a character to be recognized as "satisfactory" when, for example, the inking faults and metallic inclusions constitute local blemishes which are negligible in comparison with the mean inking of the bars in the character concerned.

All these considerations show the need to make allowance for all the possible variations in the quality of the printed characters, and in particular those variations which are related to the quality of the medium upon which the characters are printed.

In addition, such prior art reading devices are based on identifying characters as a function of the speed of relative movement between the document to be read and the read head, whether it is the document or the head which moves.

In the particular case of characters formed from vertical bars spaced apart from one another by short and long intervals, with such prior art devices a distinction is made between the two types of interval on the assumption that the predetermined speed of the bars past the front of the read head is constant. If there is any irregularity in the movement of a document to be read, such as might be caused by mis-functioning of the control mechanism, there is a corresponding variation in speed. This speed variation could result in characters being incorrectly read. For example, a long interval might be incorrectly identified as a short interval, or vice versa. Thus, with reading arrangements sensitive to the speed of relative movement between the document to be read and the read head, it is sometimes necessary to provide a more costly mechanism which is sufficiently reliable not to cause variations in speed, which variations could result in confusion between intervals of different kinds.

SUMMARY OF THE INVENTION

Accordingly, it is an object of the invention to provide improved means for reading magnetic characters at varying speeds.

It is another object of the invention to reduce the number of times characters read from a document are rejected without good reason as a result of variations in the speed of relative movement between the document and the read head.

It is still another object of the invention to reduce the possibility of characters being misidentified.

Briefly stated, and in accordance with one aspect of the invention, a device is provided for reading printed characters made up of a plurality of elements which are separated by spaces of first and second kinds in accordance with a given character code. The device includes a read head designed to detect the presence of the elements of a character which are placed in front of the head in succession, and an identification circuit having at least means for identifying the two kinds of space between consecutive elements. More particularly, in one embodiment the read head has three element detectors, a first and a second of which are separated by a distance equal to the first kind of space, and the first and a third of which are separated by a distance equal to the second kind of space. The means for identifying the two kinds of space is connected to the first and second detectors and to the first and third detectors, respectively.

Briefly stated, and in accordance with another aspect of the invention, the identification circuit also has means for identifying the beginning and end of a character. The means for identifying the beginning and end of a character is connected to the first detector and the first and third detectors, respectively.

Briefly stated, and in accordance with still another aspect of the invention, the reading device also includes means for storing coded information representing a read character. The means for storing is connected to all the identifying means so that the coded information which is stored is the result of a first element of a character being detected by the first detector, of succeeding elements of the character being simultaneously by the first and second detectors and by the first and third detectors, and of a last element of the character being detected by the third detector.

BRIEF DESCRIPTION OF THE DRAWINGS

Other objects and features of the invention, and the manner in which it is put into practice, will become apparent in the course of the following description, which is given with reference to the accompanying drawings, in which.

DETAILED DESCRIPTION OF THE DRAWINGS

Figure 1:
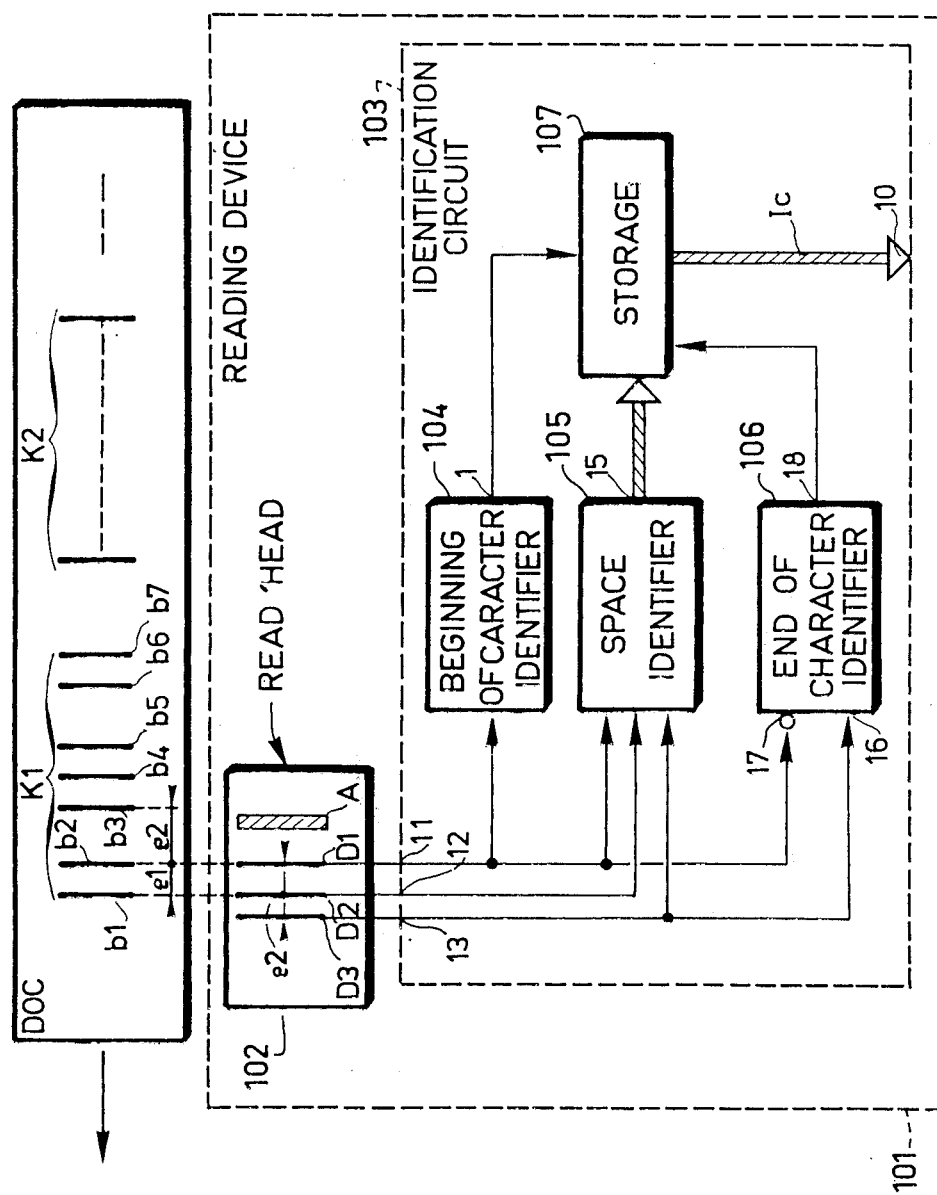
FIG. 1 is a general diagram of a device according to the invention for reading printed character.

In FIG. 1, a device 101 according to the invention for reading printed characters includes a read head 102 and an identification circuit 103. The read head 103 includes three element detectors D1, D2 and D3 whose spacing is determined by the type of characters to be read, which characters are printed on a document such as the document DOC of FIG. 1. Each character to be read is formed by a plurality of printed elements which are separated from one another by spaces of two kinds, which spaces are equal to e1 and e2, respectively, in the illustrated embodiment.

The invention is applicable in particular to reading CMC7 characters such as the characters K1 and K2 in FIG. 1. These characters are formed from seven bars which are grouped together in accordance with a given code, which is termed a "two from six" code. This code involves two long spaces equal to e2, and four short spaces equal to e1. As an example, the character K1 in FIG. 1 is formed of element bars b1, b2, b3, b4, b5, b6 and b7. Bars b1 and b2 are separated by a short space equal to e1, and bars b2 and b3 are separated by a long space equal to e2.

The detectors D1 and D2 of the read head 102 are separated by a distance equal to the first kind of space, specifically e1 in FIG. 1. The detectors D1 and D3 are separated by a distance equal to the second kind of space, specifically e2.

The CMC7 characters, such as the character K1 on document DOC, are formed from a magnetizable material. In FIG. 1, the read head 102 includes a magnet A, which enables the bars passing in front of it to be magnetized. In FIG. 1, for example, the bars pass the read head 102 in a right to left direction. The bars b1, b2, b3 etc. pass in succession in front of the magnet A. Then, when the first bar b1 of the character K1 arrives in front of detector D1, it is detected by this first detector D1, which is formed from a magneto-sensitive material. The character K1 is then successively detected by detectors D2 and D3, which are also magneto-sensitive.

In a preferred embodiment of the invention, the material from which the three detectors D1, D2 and D3 are formed is magneto-resistive. Such detectors experience a change in resistance, and hence a change in the voltage at their terminals, as a result of the action of the flux of the magnetic leakage field of the bars as they pass in front of the detectors. The detectors thus enable the presence of a bar as it passes in front of each of them to be detected. A detailed description of the reading of magnetic characters by magneto-resistive detectors is given in a French Patent Application No. 77 14661 which was filed by Compagnie Internationale pour l'Informatique CII-Honeywell Bull on May 13, 1977; and in corresponding U.S. patent application Ser. No. 899,217 filed April 24, 1978 entitled "DEVICE FOR READING MAGNETIC INFORMATION," by Jean-Pierre Lazzari, and assigned to the assignee of the present invention, the entire disclosure of which is hereby incorporated by reference.

In the particular case of FIG. 1, where the bars b1 and b2 are separated by a space of the first kind equal to e1, when bar b1 is in front of detector D2, bar b2 is in front of detector D1. Similarly, since bars b2 and b3 are separated by a space of the second kind equal to e2, when bar b2 is in front of detector D3, bar b3 is in front of detector D1.

The identification circuit 103 in FIG. 1 is designed to detect when two consecutive bars of a character either coincide with detectors D1 and D2, which is equivalent to the detection of a space of the first kind equal to e1 in FIG. 1, or coincide with detectors D1 and D3, which is equivalent to the detection of a space of the second kind equal to e2. The detection of the different spaces separating the bars forming a character makes it possible to generate, from an output 10 of identification circuit 103, information Ic which represents the character read by the reading device 101. In the case of CMC7 characters, the information Ic is coded in six bits.

In FIG. 1, the identification circuit 103 comprises means 104 for identifying the beginning of a character, means 105 for identifying the two kinds of space, and means 106 for identifying the end of a character. The beginning of character identifier 104 is connected via an input 11 of identification circuit 103 to detector D1. The space identifier 105 is connected via input 11 to detector D1, via an input 12 to detector D2, and via an input 13 to detector D3. The end of character identifier 106 is connected via input 11 to detector D1, and via input 13 to detector D3.

The identification circuit 103 of FIG. 1 also includes a means 107 for storing the information Ic corresponding to each character read from the document DOC. The storage means 107 is enabled by a signal which is emitted from an output 1 of the beginning of character identifier 104 when the beginning of a character to be read is detected, that is to say, when the first bar of a character, for example, bar b1 of character K1, arrives in front of detector D1. When, subsequent to this, detectors D1 and D2 simultaneously transmit a signal via inputs 11 and 12 to the space identifier 105, the space identifier 105 generates at its output 15 a code for the first kind of space detected by detectors D1 and D2, that is to say, a space equal to e1. Similarly, when the detectors D1 and D3 simultaneously transmit a signal via inputs 11 and 13 to the space identifier 105, the space identifier 105 generates at its output 15 a code for the second kind of space detected by detctors D1 and D3, that is to say, a space equal to e2.

The codes generated at output 15 are transmitted in succession to the storage means 107. In the case of the CMC7 characters shown in FIG. 1, each code is formed by a binary 1 or 0 bit. A 1 bit may be chosen as the code used for the second kind of space, and a 0 bit as the code for the first kind of space.

While the illustrated read head 102 comprises three element detectors D1, D2 and D3, it will be apparent that other numbers of element detectors may be employed so long as respective combinatorial pairs thereof are separated by distances equal to the first and second kinds of space. In any event, suitable identification circuitry responsive to the element detectors must be provided such that the first kind of space is identified when the detectors of one combinatorial pair simultaneously detect character elements and the second kind of space is identified when the detectors of another combinatorial pair simultaneously detect character elements. It will be recognized that in the illustrated embodiment where only three element detectors are employed, detector D1 is common to two combinatorial pairs, detectors D1 and D2 being one combinatorial pair and detectors D1 and D3 being another combinatorial pair.

With reference to FIG. 1, the operation of the end of character identifier 106 will be described as bar b7 of character K1 passes successively in front of the detectors D1, D2 and D3. Since bar b7 is the last bar in character K1, once it arrives in front of detector D3 it is the only bar coinciding with any detector. At this moment, a signal (binary 1) is transmitted via input 13 of identification circuit 103 to a first input 16 of the end of character identifier 106, while no signal (binary 0) is transmitted from detector D1 to the input 11 connected to a second input 17 of the end of character identifier 106. The state circle at the second input 17 indicates that the input is activated by a low (binary 0) signal. As a result, a signal is generated at an output 18 of the end of character identifier 106, and this signal dis-enables the storage means 107 such that any signals which may be emitted from the output 15 of the space identifier 105 are not accepted for storage. The information Ic can then be transferred to the output 10 of the identification circuit 103.

Figure 2:
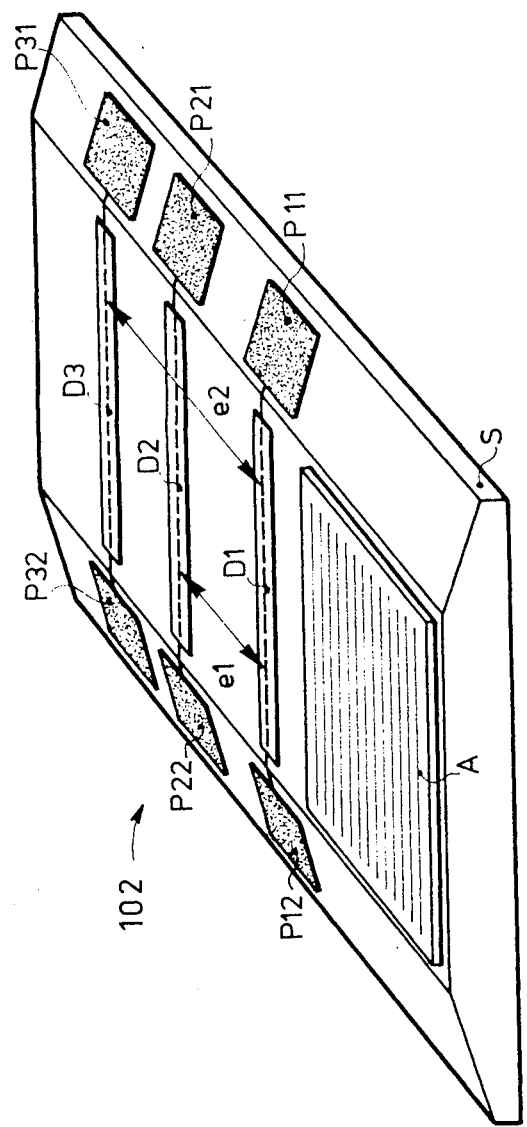
FIG. 2 shows an embodiment of a read head included within the device according to the invention.

FIG. 2 shows an embodiment of the read head 102 of FIG. 1 which may be employed where magnetic characters are to be recognized. The head 102 contains the magnet A and the three detectors D1, D2 and D3, all of which is supported on a common substrate S. The longitudinal axes of detectors D1 and D2 are separated from one another by a distance equal to e1, and of detectors D1 and D3 by a distance equal to e2. The three detectors carry a predetermined current supplied by a generator (not shown), which is connected to the terminals of the detectors by contact pads of large surface area. Specifically, the current generator is connected to detector D1 by contact pads P11 and P12, to detector D2 by contact pads P21 and P22, and to detector D3 by contact pads P31 and P32. The contacts thus made with the three detectors can be connected to the inputs 11, 12 and 13 of the identification circuit 103 of FIG. 1.

The identification circuit 103 of FIG. 1 will now be described in greater detail with reference to FIG. 3.

Figure 3:
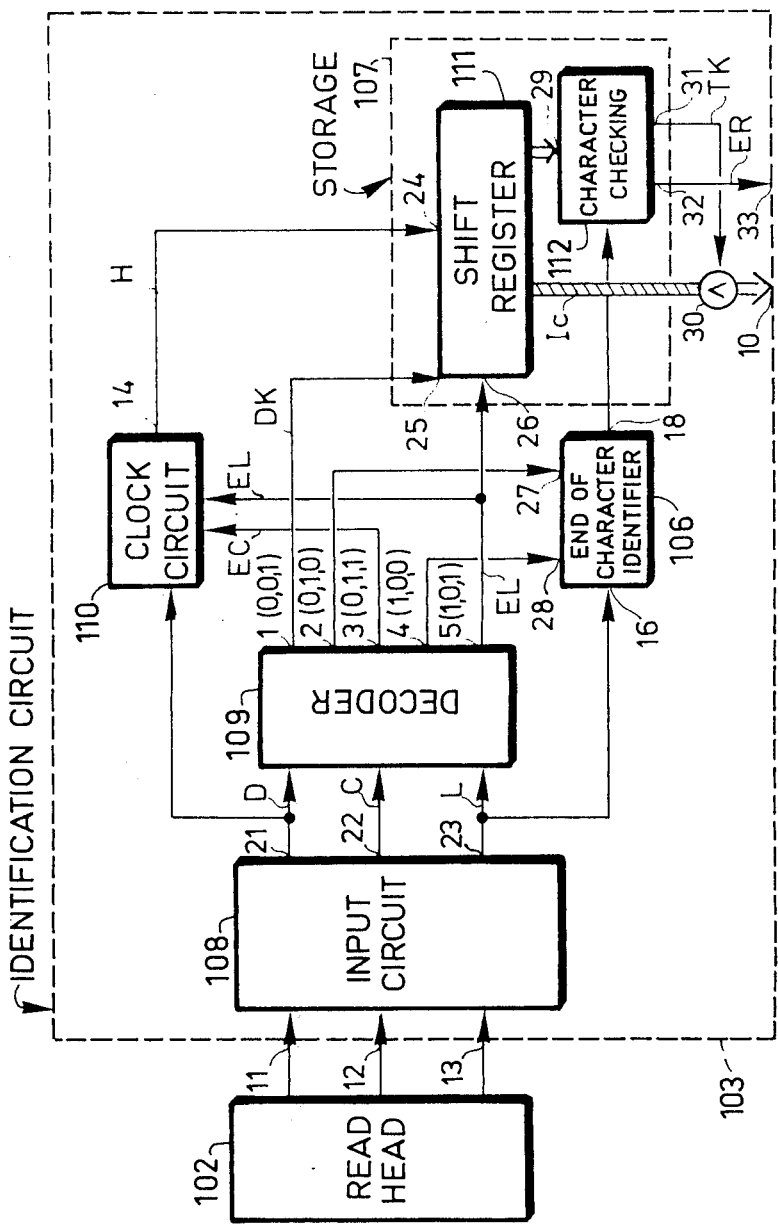
FIG. 3 is a diagram of an identification circuit included within the device according to the invention.

In FIG. 3, an input circuit 108 receives, at the inputs 11, 12 and 13, the signals generated by the three detectors D1, D2, and D3, respectively. The input circuit 108 generates at three outputs 21, 22 and 23 corresponding binary signals D, C and L. In FIG. 3, the beginning of character identifier 104 and the space identifier 105 of FIG. 7 comprise a decoder 109 which receives, respectively at three inputs, the signals transmitted by outputs 21, 22 and 23.

More specifically, decoder 109 comprises a binary-to-decimal decoder having five decimal outputs 1, 2, 3, 4 and 5 which output signals in response to the particular binary combinations (indicated in parenthesis) received by the three inputs of the decoder 109. The code DK for the beginning of a character is given by a signal at output 1, and the codes EC and EL for the first and second kinds of space are given by signals at outputs 3 and 5, respectively. Signal DK at output 1 is the result of the sole presence of signal D at the output 21 of the input circuit 108 (binary 001). Signal EC at output 3 is the result of the simultaneous presence of signals D and C at outputs 21 and 22 of the input circuit 108 (binary 011). Signal EL at output 5 is the result of the simultaneous presence of signals D and L at the outputs 21 and 23 of the input circuit 108 (binary 101). Thus, in accordance with the usual nomenclature, signal D from detector D1 is the right-most or least significant bit, signal C from detector D2 is the middle bit, and signal L from detector D3 is the left-most or most significant bit.

A clock circuit 110, which is connected to output 21 of input circuit 108, is designed to generate from an output 14, signals H when either of the two kinds of space detected by read head 102 is present.

The clock circuit 110 recognizes the presence of either of the kinds of space by means of the signals EC and EL from outputs 3 and 5 of the decoder 109. As soon as the presence of either of the two kinds of space is recognized, clock circuit 110 emits a signal H from output 14, and this signal is transmitted to an input 24 of a serial-input shift register 111 included within the storage means 107 of FIGS. 1 and 3. To reset the shift register 111 to zero before the information representing a fresh character read is stored, the signal DK to identify the beginning of a character is transmitted to another input 25 of shift register 111.

In the simplified embodiment of FIG. 3, the serial input 26 of the shift register 111 is connected to the decoder output 5 to receive signals EL representting the second kind of space. At each clock pulse represented by a signal H being transmitted to input 24 of shift register 111, a fresh bit is stored in the shift register 111, this fresh bit corresponding either to the code for the second kind of space, as indicated by the signal EL (binary 1) transmitted to input 26, or to the code for the first kind of space, as indicated by the absence of signal EL (binary 0) from input 26, that is to say, the complementary signal, EC.

In the case of CMC7 characters, such as the character K1 in FIG. 1, six H pulses enable six bits to be loaded into shift register 111. Each particular bit is either a result of a signal (binary 1) or the absence of a signal EL (binary 0). The absence of a signal EL will be understood to correspond to its binary complement, which is the presence of a signal EC.

If the character is read normally, and if there is no fault in it to upset the reading by the reading device 101, the last element of the character read is detected as a result of only signal C being present, followed by only signal L being present, at the outputs of the input circuit 108, signal L being transmitted to the input 16 of the end of character identifier 106 of FIGS. 1 and 3. The condition which may be described with reference to FIG. 1 as the absence of a signal from detector D1 (binary 0) presented to the low-activated input 17 of the end of character identifier 106 while signals (binary 1) from detectors D2 and D3 are successively produced and presented, in particular, to input 16 of the end of character identifier 106, is more particularly described with reference to FIG. 3 as the successive presenting of signals emitted by decimal outputs 2 and 4 of decoder 109 to two inputs 27 and 28 of the end of character identifier 106. The successive presence of signals at the decimal outputs 2 and 4, which signals correspond respectively to the presence of signal C alone (binary 010) and signal L alone (binary 100), represents the transitional period between the detection of the last space and the detection of the last element of the character being read. The end of character identifier 106 of FIG. 3 is designed to produce a signal from its output 18 when only the detector D3 detects an element after the decoder 109 has identified the fact that a character is currently being read.

Associated with the shift register 111 included within the storage means 107 is a character checking circuit 112 which is connected by inputs 29 to the shift register 111, and by another input to the output 18 of the end of character identifier 106. The information Ic stored in shift register 111 is transmitted to the output 10 of identification circuit 103 of FIGS. 1 and 3 via a transmission gate 30, which is activated by a signal TK emitted by an output 31 of character checking circuit 112 when the information Ic checked by the circuit is probable.

In the event of an error being detected by character checking circuit 112, a signal ER is generated at an output 32 of the circuit 112 and is transmitted to an output 33 of identification circuit 103. This permits, for example, a data processing system connected to the outputs 10 and 32, to take appropriate action.

Figure 4:
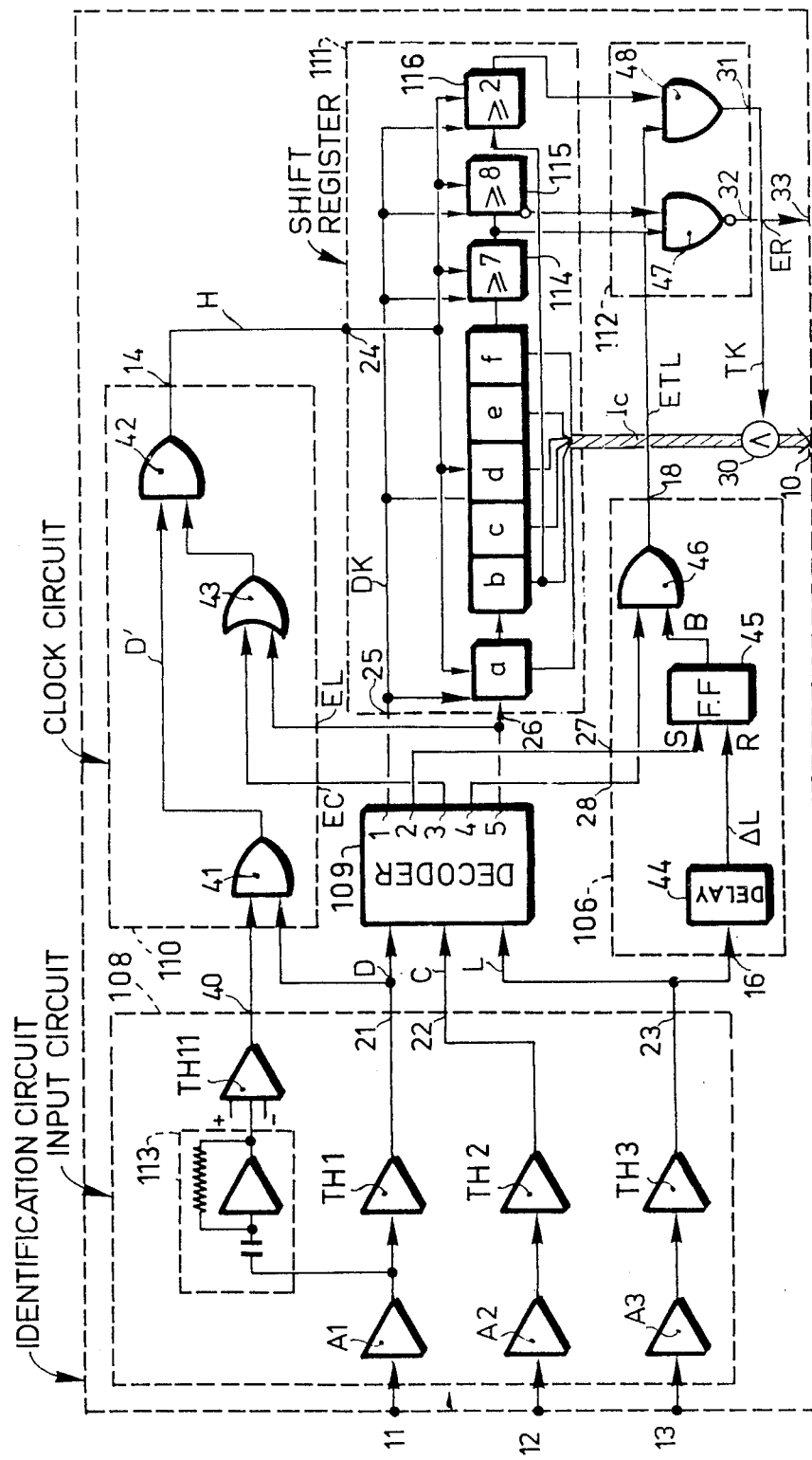
FIG. 4 is a more detailed diagram of the identification circuit of FIG. 3.

In FIG. 4, the input circuit 108 of FIG. 3 may be seen more particularly to include three amplifiers A1, A2 and A3, which are respectively connected to inputs 11, 12 and 13 of the identification circuit 103 of FIGS. 1, 3 and 4. These amplifiers are used to supply the detectors D1, D2 and D3 of FIGS. 1 and 2 by means of the contact pads P11, P12, P21, P22, P31 and P32 of FIG. 2. They are also used to amplify the electrical signals coming from the magneto-resistive detectors when the latter undergo a change in resistance due to the passage of a magnetized element in front of each of them. The input circuit 108 also includes three threshold detectors TH1, TH2 and TH3 which are respectively connected to the outputs of the three amplifiers A1, A2 and A3 so as to convert the analog signals at inputs 11, 12 and 13 into square wave signals at outputs 21, 22 and 23, respectively, of input circuit 108.

To eliminate or minimize interference, the output of amplifier A1 is connected also to a differentiator 113, the output of the latter being connected to a two-threshold detector TH11 which converts the differentiated signal at the output of the differentiator 113 into a signal corresponding to the passages through zero of the original signal from detector D1.

The signal from the output of two-threshold detector TH11 is transmitted from an output 40 of input circuit 108 to an input of an AND gate 41 in clock circuit 110, the other input of this AND gate being connected to the output 21 of input circuit 108. When signals are present at outputs 40 and 21, a signal D' is generated at the output of gate 41 and is used (in place of signal D) to sample the signals coming from detectors D2 and D3, interference thus having been eliminated.

The signals H which are generated at the output 14 of clock circuit 110 in FIGS. 3 and 4 are transmitted from the output of an AND gate 42, of which one input receives the signals D' and the other input receives a signal from an OR gate 43 if one of the signals EC or EL of FIGS. 3 and 4 is present at one of the inputs of the OR gate. Thus, the OR gate 43 is activated when either of the two kinds of space detected by the read head 102 (FIGS. 1 and 2) is present, enabling the clock circuit 110 to recognize these signals.

The end of character identifier 106 of FIG. 3 may be seen more particularly in FIG. 4 to include a device 44 for delaying the signal L received by input 16, and a flip-flop 45, which is set (S) to 1 via an input connected to decimal output 2 of decoder 109 of FIGS. 3 and 4 and which is reset (R) to 0 by a signal ΔL emitted from the output of the delay device 44. When the flip-flop 45 is set, the signal B at the output thereof is present. The end of character identifier 106 also includes an AND gate 46. This AND gate 46 emits a signal ETL, which is transmitted from the output 18 of the end of character identifier 106 to indicate the end of a read character, and at the same time enables a very long space of a third kind between two characters to be identified. The signal ETL is emitted by AND gate 46 when there is a signal present at decimal output 4 of the decoder 109 (only detector D3 producing an output) and when at the same time the flip-flop 45 has been set to 1 by decimal output 2 of the decoder 109 (when only detector D2 produced an output) and signal B is present.

The shift register 111 of FIG. 3 may be seen more particularly in FIG. 4 to comprise a set of six flip-flops, a, b, c, d, e, f, a flip-flop 114 which is set in the event seven or more bars are read, a flip-flop 114 which is set in the event eight or more bars are read, and a final flip-flop 116 which is set in the event two or more bars are read. This particular arrangement will be understood to be for reading CMC7 characters.

In operation, all the flip-flops of shift register 111 are synchronized or clocked by the signals H, which are received at input 24. The flip-flops are reset to zero by means of input 25 (signal DK). The first bit is loaded into flip-flop a from input 26, and is then transmitted to the second flip-flop b in response to a clock pulse H while a second bit is being loaded into flip-flop a. The various bits are serially received at input 26 and transferred from one flip-flop to the next until flip-flop f contains a 1 bit. At this point, the information Ic representing the character read comprises the combination of bits which has been loaded into the set of flip-flops a, b, c, d, e, and f. In cases where the read head 102 sees at least seven bars pass by, the flip-flop 114 is set.

If the read head 102 sees at least 8 bars pass, the flip-flop 115 is also set. Under these conditions, a NAND gate 47 contained in the character checking circuit 112 of FIGS. 3 and 4 generates an error signal ER from its output, which is connected to output 32 of character checking circuit 112.

A bit stored in the flip-flop 116 indicates a character is being read by indicating at least one space of one of the two kinds being detected. More particularly, when at least two bars pass in front of the read head 102, the flip-flop 116 is set by a signal which is generated from an output of flip-flop b. The signal TK by which transmission gate 30 of FIGS. 3 and 4 is activated is then generated from the output of an AND gate 48 when the latter has present at its two inputs the end of character signal ETL which is transmitted from output 18 and a signal which is emitted by the flip-flop 116 once it has been set.

Figure 5A:
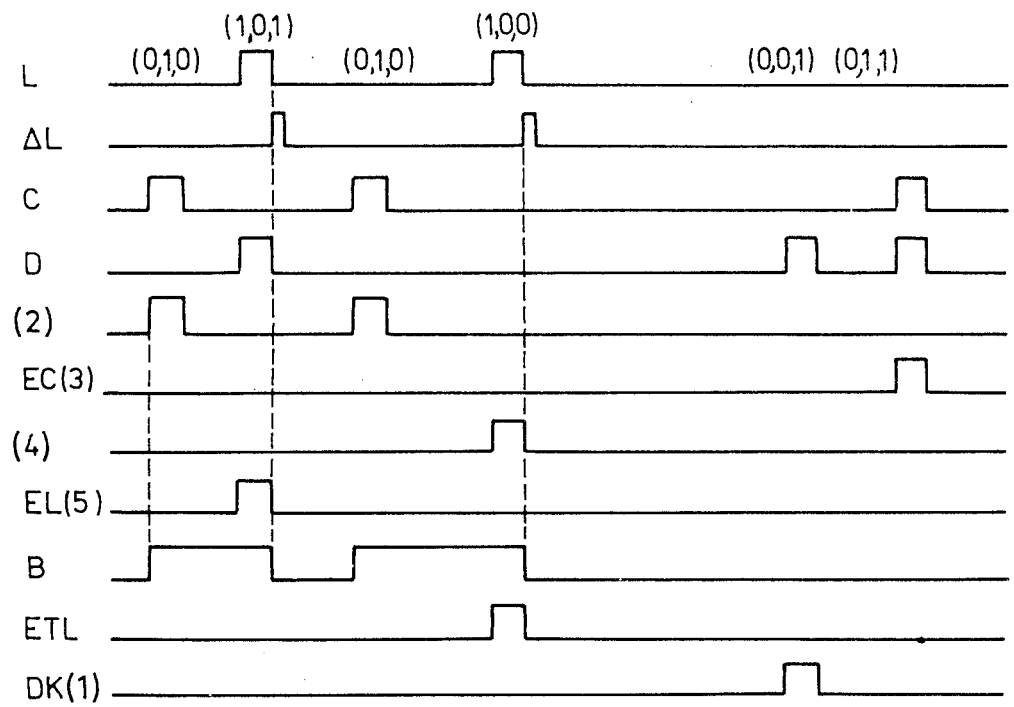
FIGS. 5a and 5b are diagrams with reference to time of signals generated in a reading device containing the identification circuit of FIGS. 3 and 4.
Figure 5B:
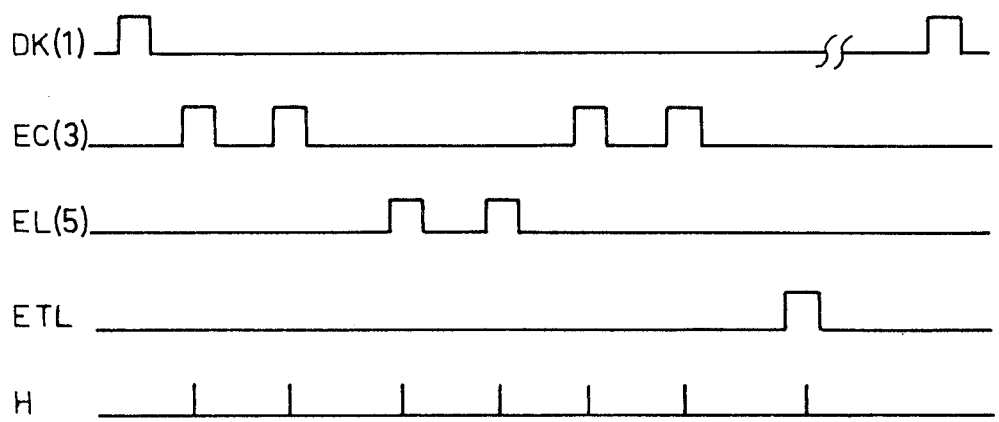

FIGS. 5a and 5b are diagrams as a function of time of the various signals generated in the identification circuit 103 of FIGS. 3 and 4. FIG. 5a is intended both to generally illustrate the form of the signals involved, and to illustrate by way of example one particular sequence as the end of one character and the beginning of the next character pass the detectors D1, D2 and D3 of the read head 102 (FIGS. 1 and 2). In the particular example, the last space of the one character is of the second kind, that is, having the wider spacing distance e2, and the first space of the next character is of the first kind, that is, having the narrower spacing distance e1. An even wider space of the third kind occurs between characters. The diagram shows signals D, C and L generated by the input circuit 108 as bars move past the detctors D1, D2 and D3, respectively, and corresponding signals generated at the outputs of the binary-to-decimal decoder 109.

Referring now specifically to FIG. 5a, as the penultimate bar of the one character passes the detector D2, a signal C alone (binary 010) causes the decoder 109 to generate a signal at its decimal output 2. Next, the penultimate bar of the one character passes the detector D3, while simultaneously the last bar passes the detector D1. From the input circuit 108 signals D and L are generated (binary 101), which results in a signal at decimal output 5 of the decoder 109, which signal is an EL signal representing the second kind of space. To complete the reading of the one character, the last bar thereof successively passes the detectors D2 and D3, resulting in the input circuit 108 producing signals C and L in succession (binary 010 followed by binary 100), and the decoder 109 producing successive signals at decimal outputs 2 and 4. The transition from binary 010 to 100 signals the beginning of the third kind of space (between characters), and the end of character identifier 106 (FIG. 4) produces an ETL signal. Specifically, the flip-flop 45 is set by a signal from decimal output 2 of the decoder 109, and therefore supplies a signal B to the AND gate 46 lower input. The signal from decimal output 4 is then supplied to the upper input of the AND gate 46, which produces the ETL signal. The ΔL signal from the delay device 44 then resets the flip-flop 44, and the signal B is removed.

As the first bar of the next character being read passes the detector D1, a signal D alone (binary 001) results in a signal at the decimal output 1 of the decoder 109. This signal is the beginning of character signal DK. Then the first bar of the next character passes the detector D2, while simultaneously the second bar passes the detector D1. The input circuit 108 generates signals C and D (binary 011), and the decoder 109 produces a signal at decimal output 3, which signal is an EC signal representing the first kind of space.

As a final example, FIG. 5b depicts the signals DK (beginning of character), EC and EL (first and second kinds of space), and ETL (end of character) as a function of time with respect to the synchronizing signal H, as an exemplary character comprising two short (e1) spaces, two long (e2), and then two short (e1) spaces is read. Additionally, the signal DK for the beginning of the next character is shown.

For reading magnetic characters, such as CMC7 characters, a read head including magneto-resistive detectors has been described as one specific embodiment. However, it will be apparent that the detectors may be designed to be magneto-sensitive with a characteristic other than resistance varying as a result of the passage of a magnetized element.

It will be further apparent that an advantage of a head with three detectors in accordance with the invention is that it enables the three kinds of space, short, long and very long, which define characters of the CMC7 type, to be directly detected and digitally processed. A head so designed also enables the characters to be detected no matter what their speed of movement, and virtually eliminates the mis-identifications which occur when known reading arrangements are employed.

While specific embodiments of the inventon have been illustrated and described herein, it is realized that modifications and changes will occur to those skilled in the art. It is, therefore, to be understood that the appended claims are intended to cover all such modifications and changes as fall within the true spirit and scope of the invention.

What is claimed is:

1. A device for reading characters formed of elements separated by spaces of first and second kinds in accordance with a character code, said device comprising:
   a read head arranged for motion relative to the elements of a character, said read head including three element detectors physically spaced such that the first and second detectors are separated by a distance equal to the first kind of space, and the first and third detectors are separated by a distance equal to the second kind of space; and means responsive to said detectors for identifying the two kinds of space, the first kind of space being identified when the first and second detectors simultaneously detect character elements, and the second kind of space being identified when the first and third detctors simultaneously detect character elements.

2. A device according to claim 1, which further comprises means for storing coded information representing a read character, said storage means being connected to receive information from said means responsive to said detectors for identifying the two kinds of space such that information is stored in said storage means as a result of successive spaces being identified.

3. A device according to claim 2, wherein information representing a complete character is stored in said storage means as the result of a first element of a character being detected by the first detector, succeeding elements of the character being detected simultaneously by the first and second detectors or simultaneously by the first and third detectors, and a last element of the character being detected by the third detector.

4. A device according to claim 1, wherein said means responsive to said detectors also identifies the beginning and end of a character.

5. A device according to claim 4, wherein said means responsive to said detectors comprises a decoder having inputs connected to receive signals from the detectors, said decoder generating either a signal indicating the beginning of a character has been detected when only the first detector detects a character element, a signal indicating a space of the first kind has been detected when the first and second detectors simultaneously detect character elements, or a signal indicating a space of the second kind has been detected when the first and third detectors simultaneously detect character elements.

6. A device according to claim 5, wherein:

said decoder has a pair of outputs at which signals indicating spaces of the first and second kind are respectively generated; and which further comprises a serial-input shift register for storing information from the output of said decoder representing a read character, said shift register including a set of flip-flops at least equal in number to the number of spaces in a character, the serial input of said shift register being connected to one of said pair of outputs of said decoder.

7. A device according to claim 6, which further comprises:

means for resetting said shift register in response to a beginning of character signal from said decoder; and means responsive to said decoder for clocking said shift register in response to either a signal indicating a space of the first kind has been detected or a signal indicating a space of the second kind has been detected.

8. A device according to claim 7, wherein:

said shift register includes first and second additional flip-flops connected in series with said set of flip-flops, such that a bit stored in said first additional flip-flop indicates that a number of elements at least equal to the number of elements of a complete character have been detected, and a bit stored in said second additional flip-flop indicates that a number of elements greater by one than the number of elements of a complete character have been detected;

and which device further comprises a checking circuit for generating an error signal when bits are stored in both of said additional flip-flops.

9. A device according to claim 8, wherein:

said shift register includes a third additional flip-flop which is connected to the second of said set of serially-corrected flip-flops such that a bit stored in said third additional flip-flop indicates that a character is being read by indicating at least one space of one of the two kinds being detected; and wherein:

said checking circuit includes means responsive to said third additional flip-flop and to said end-of-character identifying means for generating a signal indicating the end of the reading of a character.

10. A device according to claim 9, which further comprises gate means responsive to the signal indicating the end of the reading of a character for transferring information from said set of flip-flops to an output of said reading device.

11. A device according to claim 1, wherein the elements of the characters being read comprise a magnetizable ink, and said detectors of said read head are magneto-sensitive.

12. A speed-insensitive device for reading characters formed of elements separated by spaces of first and second kinds, said device comprising:

a read head arranged for motion relative to the elements of a character, said read head having a plurality of element detectors physically spaced such that detectors forming one combinatorial pair are separated by a distance equal to the first kind of space, and detectors forming another combinatorial pair are separated by a distance equal to the second kind of space; and means responsive to said detectors for identifying the two kinds of space, the first kind of space being identified when the detectors forming said one combinatorial pair simultaneously detect character elements, and the second kind of space being identified when the detectors forming said other combinatorial pair simultaneously detect character elements.

13. A speed-insensitive reading device according to claim 12, wherein said read head comprises first, second and third element detectors, and wherein the first and second detectors comprise said one combinatorial pair and the first and third detectors comprise said other combinatorial pair.

* * * * *

UNITED STATES PATENT AND TRADEMARK OFFICE
CERTIFICATE OF CORRECTION

PATENT NO. : 4,182,481
DATED : January 8, 1980
INVENTOR(S) : Daniel MAUSSION

It is certified that error appears in the above-identified patent and that said Letters Patent are hereby corrected as shown below:

Claim 1, Col. 11, line 11, "detctor" should be spelled --detector--.

Signed and Sealed this

Twentieth Day of May 1980

[SEAL]

Attest:

SIDNEY A. DIAMOND

*Attesting Officer* — *Commissioner of Patents and Trademarks*